United States Patent [19]

Zellmer

[11] 4,065,807
[45] Dec. 27, 1977

[54] DC-TO-DC VOLTAGE CONVERTER EMPLOYING A COMMON TRANSISTOR IN BOTH SWITCHING AND MULTIVIBRATOR FUNCTIONS

[75] Inventor: Neale A. Zellmer, Belmont, Calif.

[73] Assignee: GTE Automatic Electric Laboratories Incorporated, Northlake, Ill.

[21] Appl. No.: 766,173

[22] Filed: Feb. 7, 1977

[51] Int. Cl.² .......................................... H02M 3/155
[52] U.S. Cl. ....................................... 363/16; 307/138
[58] Field of Search ................. 307/138; 321/2, 45 R; 363/16, 18

[56] References Cited

U.S. PATENT DOCUMENTS

| 3,240,989 | 3/1966 | Grunwaldt | 331/113 X |
|---|---|---|---|
| 3,470,443 | 9/1969 | Berry et al. | 307/138 X |
| 3,867,949 | 2/1975 | Schwalm et al. | 331/113 R X |
| 3,970,871 | 7/1976 | Zellmer | 321/2 X |

*Primary Examiner*—William M. Shoop
*Attorney, Agent, or Firm*—Russell A. Cannon; Leonard R. Cool

[57] ABSTRACT

In this converter, a common transistor Q2 is one of the two transistors Q1 and Q2 of a multivibrator and is also one of a pair of power switching transistors Q2 and Q3 that are connected in series across an input port receiving an input voltage-V of one polarity. The other transistor Q1 of the multivibrator is also connected across the input port. The multivibrator causes the switching transistors Q2 and Q3 to be alternately conducting and nonconducting. A pair of capacitors C3 and C4 and unidirectional diodes D4, D5, and D6 are connected to the switching transistors Q2 and Q3 in such a manner that only one capacitor C3 is charged in one direction during conduction of the common transistor Q2, and that this one capacitor C3 discharges through the other capacitor C4 to charge the latter and produce an output voltage of the other polarity across it and an output port only during conduction of the other switching transistor Q3. A fourth transistor Q4 operating as a current amplifier is connected between the multivibrator transistors Q1 and Q2 for providing a current drive to the common transistor Q2.

8 Claims, 1 Drawing Figure

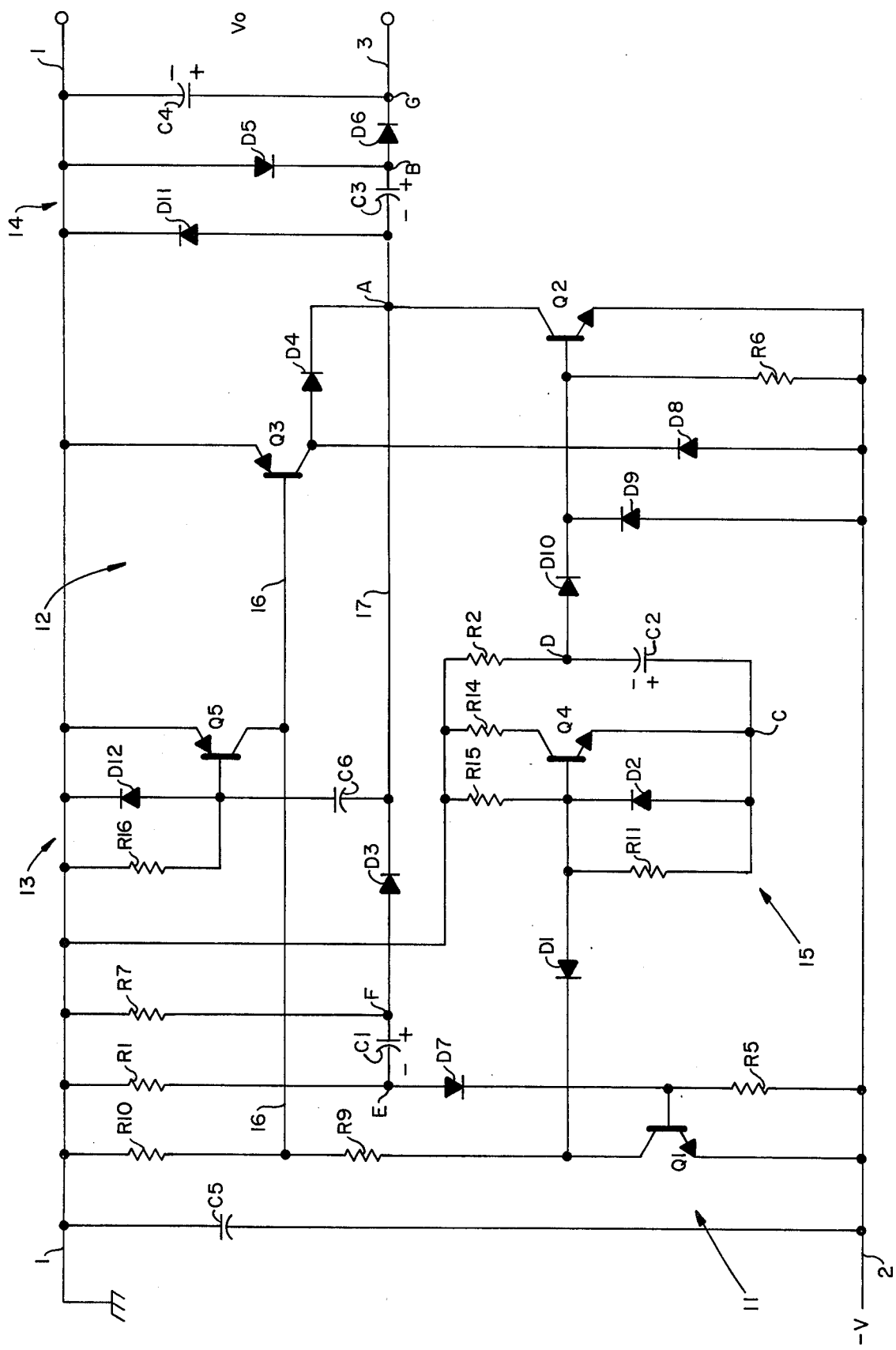

DC-TO-DC VOLTAGE CONVERTER EMPLOYING A COMMON TRANSISTOR IN BOTH SWITCHING AND MULTIVIBRATOR FUNCTIONS

BACKGROUND OF INVENTION

This invention relates to electrical DC-to-DC converters and more particularly to such circuitry for converting an input voltage of one polarity to an output voltage of the opposite polarity.

It is sometimes desirable to convert a source of unidirectional voltage of one polarity to a source of unidirectional voltage of the opposite polarity. This need arises, for example, when a semiconductor device is employed in an electrical circuit in which the only voltage source available is one of the wrong polarity.

An inductorless converter for accomplishing this function is disclosed in U.S. Pat. No. 3,970,871, issued July 20, 1976, Negative DC to Positive DC Converter, Ser. No. 443,587, filed Feb. 19, 1974, by the same inventor. The converter there includes a pair of transistors in a quick-setting astable multivibrator circuit that is powered by a DC voltage source of one polarity and which drives two pairs of transistors 81, 82 and 90, 98 comprising power switches. Capacitor means is connected across one pair of switching transistors for producing a DC voltage of the opposite polarity. Transistor subcircuits 87 and 99 are employed to reduce the reset time of switching transistors 81 and 98. An object of this invention is the provision of a more economical and simplified voltage converter circuit for accomplishing a similar function.

SUMMARY OF INVENTION

In accordance with this invention, the multivibrator and power switches of a voltage converter share at least one common switching transistor. In a preferred embodiment, a current amplifier provides drive current for the common transistor.

BRIEF DESCRIPTION OF DRAWING

This invention will be more fully understood from the following descriptions of preferred embodiments thereof that are referenced to the attached single FIGURE and sheet of drawing, which is a block diagram of a preferred embodiment of a voltage converter in accordance with this invention.

DESCRIPTION OF PREFERRED EMBODIMENTS

The voltage converter embodying this invention in the single figure of the drawing is a two-port device having a source of constant voltage of one polarity connected across input lines 1 and 2. The voltage source may be a battery (not shown). In the circuit of the drawing, line 1 is grounded and line 2 is connected to the negative terminal of the battery. A capacitor C5 having a large value of capacitance is connected across the input lines 1 and 2 to filter the battery voltage and thereby make the input voltage to the converter circuit more nearly constant. A relatively constant voltage of the opposite polarity is coupled from output lines 1 and 3. The converter in the figure generally comprises a multivibrator circuit 11 including a pair of transistors Q1 and Q2; a power switching circuit 12 including the multivibrator transistor Q2, which is preferably a power transistor, and a second power transistor Q3; a circuit 13 for reducing the reset or turnoff time of the switching transistor Q3; capacitive means 14; and a current amplifier stage 15.

The multivibrator transistors Q1 and Q2 are of the same conductivity type and operate 180° out of phase. The emitter electrodes of the transistors are directly electrically connected to input line 2. Their base electrodes are connected through associated bias resistors R5 and R6 to line 2. One side of a diode D7 is connected to the Q1 base electrode. The other side of D7 is connected through timing resistor R1 to ground, through the series combination of timing capacitor C1 and resistor R7 to ground, and through C1 and a pull-down diode D3 to the Q2 collector electrode. The elements R1 and C1 set the time constant which controls the time interval that Q1 is cut off. The diode D7 protects the Q1 base-emitter junction from being damaged by the charge on C1 as Q2 is caused to conduct.

The Q1 collector electrode is connected through resistors R9 and R10 to ground. These resistors R9 and R10 operate as a voltage divider during turn-on of Q1 and Q3. When Q1 conducts, R9 serves as a base current limiting resistor for Q3.

The operation of multivibrator 11 will now be considered briefly. Prior to conduction of Q2, the other multivibrator transistor Q1 conducts to charge C1 to approximately $-V$ through R7, D7 and R5, and in the direction indicated in the drawing. When Q2 conducts, node F is pulled down near $-V$ by D3. This causes the charge on C1 to push node E below $-V$ to cut off Q1. Timing capacitor C1 then charges toward ground potential through Q1 to set the time that Q1 is reset.

The Q2 collector electrode is electrically connected through the pull-down diode D3 and R7 to ground. The Q2 base electrode is connected through a diode D10 to the junction D of a timing resistor R2 and timing capacitor C2. The diode D10 protects the Q2 base-emitter junction from being damaged by the charge on C2 as Q2 is driven into cut off. The values of the resistor R2 and capacitor C2 set the time constant which controls the time interval that Q2 is cut off. The other side of R2 is connected to ground. The other or node C side of C2 is connected through the parallel combination of a diode D2 and resistor R11 and then a diode D1 to the Q1 collector electrode.

As stated previously, the transistor Q2 operates as a power transistor in the switching circuit 12 as well as operating as one-half of the multivibrator circuit 11. In order to provide an adequate base current for driving the power transistor Q2 into saturation, without affecting the operation of the associated timing circuit R2C2, a grounded-collector current amplifier comprising transistor Q4 is connected across the timing resistor R2 and capacitor C2. If Q2 were an ideal transistor switch with infinite current gain, then Q4 would not be required. The bias resistor R11, sets the conduction level of Q4. The resistors R14 and R15 are current limiting resistors. The diodes D1 and D2 are pull-down diodes which are turned on by conduction of Q1 to rapidly pull down the Q4 base potential and the node C side of capacitor C2 negative. This operation causes Q2 and Q4 to be rapidly cut off when Q1 starts to conduct. The diode D1 also decouples the recharging timing capacitor C2 from the Q1 collector electrode when Q1 is cut off. The diode D3 performs similar functions in decoupling the recharging timing capacitor C1 from the Q2 collector electrode when Q1 is conducting and of rapidly pulling the Q2 collector down to approximately $-V$ when the latter conducts.

In the power switching circuit 12, the Q2 and Q3 emitter-collector junctions and a diode D4 are electrically connected in series across the battery. The Q3 base electrode is connected on line 16 to reset circuit 13 and to the Q1 collector electrode. The reset circuit 13 comprises a transistor Q5 having the parallel combination of a bias or tieback resistor R16 and clamping diode D12 connected across its base-emitter junction. The Q5 emitter-collector junction is connected across the Q3 base-emitter junction. The Q5 base is also connected through a small differentiating capacitor C6 to the Q2 collector electrode. The diode D12 clamps the Q5 base to ground to prevent it going far enough positive to damage its base-emitter junction as the collector of Q2 goes positive. When the Q2 collector goes negative, C6 produces a short negative pulse on the Q5 base which turns Q5 on momentarily to sweep the base of Q3 clear of any charges and thereby speeds up its reset. The circuit 13 enables reset of Q3 in approximately 2 microseconds instead of typically 20 – 30 microseconds for a conventional power transistor. The resistors R5, R6, R10, and R14 also have low values of resistance for rapidly draining any charge from the base electrodes of associated transistors Q1, Q2, Q3, and Q4 when they are cut off.

The capacitive storage means 14 comprises a pair of capacitors C3 and C4 and a power diode D6 which are connected in series between the node A and ground. A second power diode D5 is connected between ground and the node B. The diodes D5 and D6 are poled so that only capacitor C3 is charged in the polarity indicated in the figure when D5 and Q2 conduct. The capacitor C3 is charged in this cycle of operation, with D5 and Q2 conducting, to the battery voltage V minus the voltage drops across D5 and the Q2 emitter-collector junction. Similarly, these diodes D5 and D6 are poled so that C3 discharges and only C4 is charged in the polarity indicated when Q3, D4, and D6 conduct. The output voltage is taken across C4 which is charged in this half cycle of operation to the voltage +V, less the voltage drops across D4, D5 and D6, and the Q2 and Q3 base-emitter junctions.

The capacitors C3 and C4 are preferably electrolytic capacitors which preferably have large values of capacitance, as well as high voltage, and current capacities. These capacitors are polarized in the directions shown in the figure. Since electrolytic capacitors are not ideal elements, however, C3 and C4 may include considerable parasitic inductance. It has been observed that these parasitic inductances of elements C3 and C4 may cause voltage pulses during the time interval in which Q2 and Q3 are changing conduction states. Such parasitic pulses could forward bias the Q3 collector-emitter junction when Q3 is cut off and damage it. This condition could occur when Q3 cuts off faster than the time interval that is required to turn on Q2 and cause it to conduct, and vice versa. If this operation causes a positive voltage pulse to appear at node A which is greater than the Q3 collector voltage, than D4 protects Q3 by turning off faster than Q2 turns on to isolate node A from the Q3 collector. At the same time, D11 protects Q3 by clamping the node A potential to ground if the latter tends to go more than 0.7 volt above ground. If the circuit operation causes a negative voltage pulse to appear at node A when Q2 is cut off and Q3 has not yet turned on, then this negative voltage turns both D4 and D8 on to clamp the Q3 collector electrode to keep it from going more negative than −V and to thereby protect Q3. The diode D10 decouples the timing circuit R2C2 from the Q2 base drive requirements and prevents C2 discharging through the Q2 base-emitter junction when Q2 is cut off. Diode D10 operates to clamp the Q2 base electrode to the negative supply potential through R6 when the potential at node D is more than 0.7 volts above the supply voltage −V. Since the diode D10 can have an associated capacitance, a diode D9 is employed to protect the Q2 base-emitter junction by clamping the node D to −V when D10 conducts.

In viewing the operation of this voltage converter, consider that the circuit has been operating for some time so that C1, C2, C3, and C4 are charged in the directions shown in the drawing. Also, consider that transistors Q1 and Q3 are saturated and diodes D1, D2, D4, D6, and D7 have been conducting for a period of time. This means that the transistors Q2, Q4, and Q5 and the diodes D3, D5, and D8 – D12 are cut off. Also, C2 is charging toward ground through R2, D2, D1, and Q1 and in the direction opposite to that indicated in the figure. Conduction of Q3, D4, and D6 allows C3 to discharge through C4 to charge the latter in the direction indicated. The diode D6 prevents C4 discharging through the remainder of the converter circuit when Q3 is cut off. The charge on C4 is dissipated only by the amount of charge provided to a load circuit (not shown) that is connected between output lines 1 and 3.

When the voltage at node D between R2 and C2 is sufficiently positive from charging of timing capacitor C2 through timing resistor R2, and D2, D1, and Q1, then D10 and Q2 start to conduct. At this time, C1 is charged to the battery voltage −V. The drop in the Q2 collector voltage at node A turns D3 on to provide collector current for Q2 through R1 and R7. It also drives the voltage at node E on C1 negative to approximately two times the battery voltage which cuts off D7 and Q1. The timing capacitor C1 then charges through the timing resistor R1 toward the ground potential. This charging of C1 continues until the voltage at node E is sufficiently positive to cause Q1 to again conduct. The increase in the Q1 collector voltage on line 16 due to Q1 being driven into cut-off starts to turn Q3 off and cuts off diodes D1 and D2. The transistor Q4 now conducts and operates as a low-impedance current source for charging timing capacitor C2 through D10, the Q2 base-emitter junction, R14, and the Q4 collector-emitter junction in the direction shown in the drawing. This causes D9 to conduct to clamp node D to the negative supply voltage. This lowers the Q2 collector voltage even more. The decrease in the Q2 collector voltage is also converted to a negative voltage pulse by C6 on the Q5 base electrode. This causes Q5 to conduct to short-circuit the Q3 base-emitter junction and rapidly drive Q3 into cut off. If a positive going pulse voltage appears at node A at this time, then D4 is cut off and D11 may conduct to protect Q3. This operation causes Q2 to be driven into saturation and Q1 and Q3 to be cut off. Conduction of Q2 also causes D5 to conduct through C3 and Q2 to recharge this power capacitor C3 in the direction indicated in the drawing. The diode D6 prevents C4 discharging through Q2.

When the node E potential on timing capacitor C1 is sufficiently positive, D7 conducts to forward-bias Q1 and cause the latter to again conduct. The resultant drop in the Q1 collector voltage and the charge voltage on C2 cause D1 and D2 to conduct to pull down the node C voltage to approximately the ground potential. This forces the node D side of C2 negative to drive D10 and Q2 into cut off. Conduction of D2 also cuts off Q4 to cause C2 to again charge in the reverse direction through R2, D2, D1, and Q1 toward the ground potential. The change in the Q1 collector voltage turns Q3 and D4 on, which pulls the node A up near the ground potential and the charge on C3 forces node B above ground. If a negative voltage pulse appears at node A at this time, then both D4 and D8 conduct to clamp the Q3 collector electrode to $-V$ to protect Q3. The diode D5 is also cut off and the diode D6 caused to conduct to enable C3 to discharge through D6, C4, Q3, and D4. In this manner, the output power capacitor C4 is recharged. The timing capacitor C1 is still charging during this time interval to raise the node E potential toward ground. When the charge on C2 again reaches the Q2 turn-on voltage, Q2 again conducts and this cycle of operation is repeated. This multivibrator operation is self-sustained, the capacitor C4 being charged to approximately the supply voltage, less the base-emitter junction voltages of Q2 and Q3, and the voltage drops across diodes D4, D5, and D6.

The timing capacitors C1 and C2 and the associated timing resistors R1 and R2 determine the durations of the respective half-cycles of multivibrator operation set by Q1 and Q2, respectively, and thus the switching rate of power transistors Q2 and Q3. Selection of the multivibrator switching rate is based on the particular application so that it will not create interference with associated equipment. The capacitances of the power capacitors C3 and C4 are both inversely proportional to this switching frequency. Also, power loss increases at higher switching rates due to switching transients and switching losses with transistors.

In practice, a resistive load (not shown) is connected across output lines 1 and 3. The power limit of the voltage converter in the drawing is reached when the recharge time of C4 from C3 is appreciable with respect to the discharge time of C4 through the resistive load connected across lines 1 and 3.

What is claimed is:

1. An inductorless dc-to-dc voltage converter for converting a dc input voltage of one polarity to a dc output voltage of the opposite polarity comprising:

an input port having a pair of terminals to which the dc input voltage of one polarity is to be applied;

an output port having a pair of terminals across which the dc output voltage of the opposite polarity is to be produced;

first means electrically connecting one terminals of said input and output ports together;

second means which is a regenerative switching means comprising first and second transistors which are free running and operating 180° out-of-phase;

third means which is a current switching means comprising said second transistor of said second (regenerative switching) means, a third transistor, and fourth means for electrically connecting the primary conduction paths of said third transistor and the common-second transistor in series across said input port, said second and third transistors also operating 180° out-of-phase with each other, being of opposite conductivity types, and have their emitter-collector junctions electrically connected in series across said input port; said third transistor being responsive to and controlled by the operation of said first transistor;

a first capacitor electrically connected across said output port;

a second capacitor;

a first diode;

fifth means electrically connecting said first diode and second capacitor in series in that order between the other output terminal and a common electrical connection point of said second and third transistors;

a second diode electrically connected between said one output terminal and the junction of said second capacitor and said first diode;

said first and second diodes being poled for only said second diode conducting through said second capacitor and said second transistor for charging said second capacitor in one direction during conduction of said second transistor; said first diode being cut off during this time interval of conduction of said second transistor for preventing said first capacitor discharging through the converter circuitry; and being poled for only said first diode conducting through said first capacitor, said third transistor, and said second capacitor for charging the latter during conduction of said third transistor for producing a relatively constant output voltage across said output port of the opposite polarity;

said fourth (connecting) means comprising a third diode in the electrical connection between said second and third transistors and also in the electrical connection between said second capacitor and said third transistor, said third diode being poled for isolating the emitter-collector junction of said third transistor from a pulse voltage of one polarity at the said second capacitor during nonconduction of said third transistor.

2. The converter according to claim 1 including a fourth diode electrically connected between said one input terminal and the junction of said third diode with said second capacitor; said fourth diode being poled for conducting in response to a pulse voltage of the other polarity at the junction of said second capacitor and third diode that exceeds a prescribed potential during nonconduction of said third transistor for protecting the emitter-collector junction of the latter.

3. The converter according to claim 2 including a fifth diode electrically connected between the other terminal of the input port and the junction of said third diode with said third transistor; said third and fifth diodes being poled to conduct in response to a pulse voltage of the one polarity at the junction of said second capacitor and said third diode that exceeds a prescribed potential during nonconduction of said third transistor for protecting the latter.

4. The voltage converter according to claim 3 wherein said second transistor has a base electrode and said second (regenerative switching) means comprises a timing circuit associated with said second transistor base electrode for controlling turn-on thereof, and sixth means associated with said timing circuit and said second transistor for unloading said timing circuit from the base drive current requirements of said second transistor; said sixth means including a fourth transistor having one of its emitter and collector electrodes electrically connected to one input terminal; said timing circuit comprising a first resistor and a third capacitor electrically in series across said fourth transistor emitter-collector junction.

5. The voltage converter according to claim 4 including a sixth diode being electrically connected between said second transistor base electrode and the junction of said first resistor with said third capacitor and a seventh diode electrically connected between said second transistor base electrode and said other input terminal; said seventh diode being poled for clamping said second transistor base electrode to the potential on said other input terminal when said second transistor is cut off for protecting said second transistor base-emitter junction from pulse voltages during nonconduction of this transistor.

6. The voltage converter according to claim 4 wherein said fourth transistor has a base electrode, and said first transistor has emitter and collector electrodes electrically connected in series across said input port and has a base electrode; said converter including an eighth diode being electrically connected between said fourth transistor base electrode and the one of said emitter and collector electrodes thereof that is electrically connected to said third capacitor, and a ninth diode being electrically connected between said fourth transistor base electrode and one of said first transistor emitter and collector electrodes; said eighth and ninth diodes being pull-down diodes for increasing the speed of cut off of said fourth transistor, and thus said second transistor.

7. The voltage converter according to claim 6 including a fifth transistor having an emitter-collector junction electrically connected across the junction between said third transistor base electrode and one of said third transistor emitter and collector electrodes thereof that is electrically connected to said first input terminal for speeding up the time required to cut off said third transistor.

8. The voltage converter according to claim 7 wherein said fifth transistor has a base electrode and including a fourth capacitor electrically connected between said fifth transistor base electrode and the junction of said second capacitor and said second transistor for speeding up the turn-on of said fifth transistor and thus the cut off of said third transistor.

* * * * *